METHOD AND APPARATUS FOR CONTACT PRINTING FILM

Filed Jan. 8, 1968 5 Sheets-Sheet 1

Inventors
Robert Beispel
Margery S. Wolf

By Dressler, Goldsmith, Clement & Gordon
Attorneys

Sept. 23, 1969 M. S. WOLF ET AL 3,468,606

METHOD AND APPARATUS FOR CONTACT PRINTING FILM

Filed Jan. 8, 1968 5 Sheets-Sheet 2

Inventors
Robert Beispel
Margery S. Wolf
By Dressler, Goldsmith, Clement & Gordon
Attorneys Inventors
Robert Beispel
Margery S. Wolf
by Dressler, Goldsmith, Clement & Gordon
Attorneys

Sept. 23, 1969 M. S. WOLF ET AL 3,468,606

METHOD AND APPARATUS FOR CONTACT PRINTING FILM

Filed Jan. 8, 1968 5 Sheets-Sheet 4

Inventors
Robert Beispel
Margery S. Wolf
By Dressler, Goldsmith, Clement & Gordon.
Attorneys

METHOD AND APPARATUS FOR CONTACT PRINTING FILM

Filed Jan. 8, 1968 5 Sheets-Sheet 5

INVENTORS
Robert Beispel
Margery S. Holt
BY Drawler, Goldsmith, Clement & Gordon
ATTORNEYS 3,468,606

METHOD AND APPARATUS FOR CONTACT PRINTING FILM

Margery S. Wolf, Evanston, and Robert Beispel, Skokie, Ill., assignors, by mesne assignments, to Extek, Inc., a corporation of Nevada Continuation-in-part of application Ser. No. 501,029, Oct. 22, 1965. This application Jan. 8, 1968, Ser. No. 696,357

Int. Cl. G03b *27/20*

U.S. Cl. 355—91 14 Claims

ABSTRACT OF THE DISCLOSURE

A method and apparatus for contact printing from a patterned transparent film onto a moving layer of light-sensitive material. The film and layer of light sensitive material are kept in register with each other through the use of a vacuum printing guide while the side edges of the film and material are kept separated from each other by a pair of wires. As the film and the layer of light sensitive material are caused to move through the exposure zone, they may move either along a straight line or a spiral path, depending upon the particular embodiment desired. Additionally a wedge shaped vacuum generating device can be used for separating the film from the layer of light sensitive material after they leave the exposure zone.

This application is a continuation-in-part of our co-pending application Ser. No. 501,029, filed Oct. 22, 1965.

This invention relates to a method and apparatus for transferring information from a first film carrying recorded information to a second moving film to which the information is to be transferred, and more particularly to such method and apparatus in which the first film and the second film are kept in register with each other through the use of vacuum. The illustrative embodiment of the invention concerns the contact printing of a positive image from a negative film corresponding to the positive image.

Disadvantages of known methods

Methods presently employed for contact printing from a continuous negative film upon a moving, light-sensitive, continuous web present many problems. One such method employs mechanical means to maintain the same speed for both the continuous negative film and the continuous web of light-sensitive material. This requires costly gear and synchronous motor controls, since gear and pulley pressure rolls must be coordinated with the traveling film and web so as to maintain even tension upon the two.

A second method of contact printing from a continuous negative film upon a moving, continuous web of light-sensitive material is to carry out the printing on a discontinuous rather than a continuous basis. In this method, the film and web are moved a predetermined distance, and then stopped in a zone where they may be held in register around their entire perimeter in a frame device. With the film and web so held, air is evacuated from between them and the contact printing is carried out. When the film and web have been exposed to the printing light for a sufficient length of time, the film and web are again moved forward a predetermined distance to bring a new portion of each into the exposure zone.

Both known methods have serious disadvantages. In the first method, any variance in the speed of travel between the negative film and the light-sensitive web can cause a blurred image. Moreover, any exertion of pressure to keep the film and web taut against each other may stretch either one or the other, and thereby cause a loss of detail in the image produced. In the second method, although accuracy of printing is maintained, the speed and efficiency of a continuous method is impossible to obtain.

Summary of invention

The method and apparatus of the present invention make it possible to obtain complete accuracy of printing, and at the same time achieve great speed and efficiency.

The method involves bringing a patterned transparent film into close proximity with a moving layer of light-sensitive material, applying a vacuum to the film and layer to keep them pressed together and in register with each other, and continuously moving the film and layer of light-sensitive material thus assembled through an exposure zone where a light is directed upon the exposed surface of the film. After the film and layer of light-sensitive material have passed through the exposure zone, the vacuum is released and the two are separated.

In one embodiment of the invention, the side edges of the master film are separated from the side edges of the light-sensitive material, while the image portion of the film is permitted to be pressed together with the layer of light-sensitive material.

In one embodiment, the film and light-sensitive material are prevented from diverging too sharply when they are separated from each other, by splitting them apart with a wedge-shaped member and at the same time applying a vacuum to the surfaces of the film and layer that were initially pressed together, so as to hold the film and light-sensitive layer against the splitting wedge and any additional guide member provided for further travel of the film and the light-sensitive layer.

The method and apparatus of this invention are well adapted to use with continuous master films and continuous webs of light-sensitive material, but are also adapted to use with cut negative film and even with discrete segments carrying light-sensitive material.

In one embodiment of the apparatus of this invention, means are provided for applying a vacuum to the outer edges of the moving continuous master film and continuous web of light-sensitive material, and the differential gas pressure for keeping the film and web pressed together is provided by the atmosphere adjacent one of the film and web and a pressure box having a foraminous wall adjacent the other of the film and web, the interior of the box being in communication with the atmosphere. In another embodiment, the differential gas pressure may be provided by positioning a wall between the vacuum-applying means and the atmosphere, the wall having a gasket means at its edge which is in sliding contact with the edge portions of the exposed surface of either the negative film or web of light-sensitive material.

Still other variations may be employed. The course followed by the master film and the light-sensitive layer through the exposure zone may be selected, for example, as a helical path in order to cause the light rays to strike the film at right angles throughout.

The invention will be further described in connection with the accompanying drawings, in which:

FIGURE 4 is a cross-sectional view of one embodiment of the feature of the apparatus of this invention which prevents the separated master film and layer of light-sensitive material from diverging too sharply after they leave the exposure zone;

Figures 1, 2:
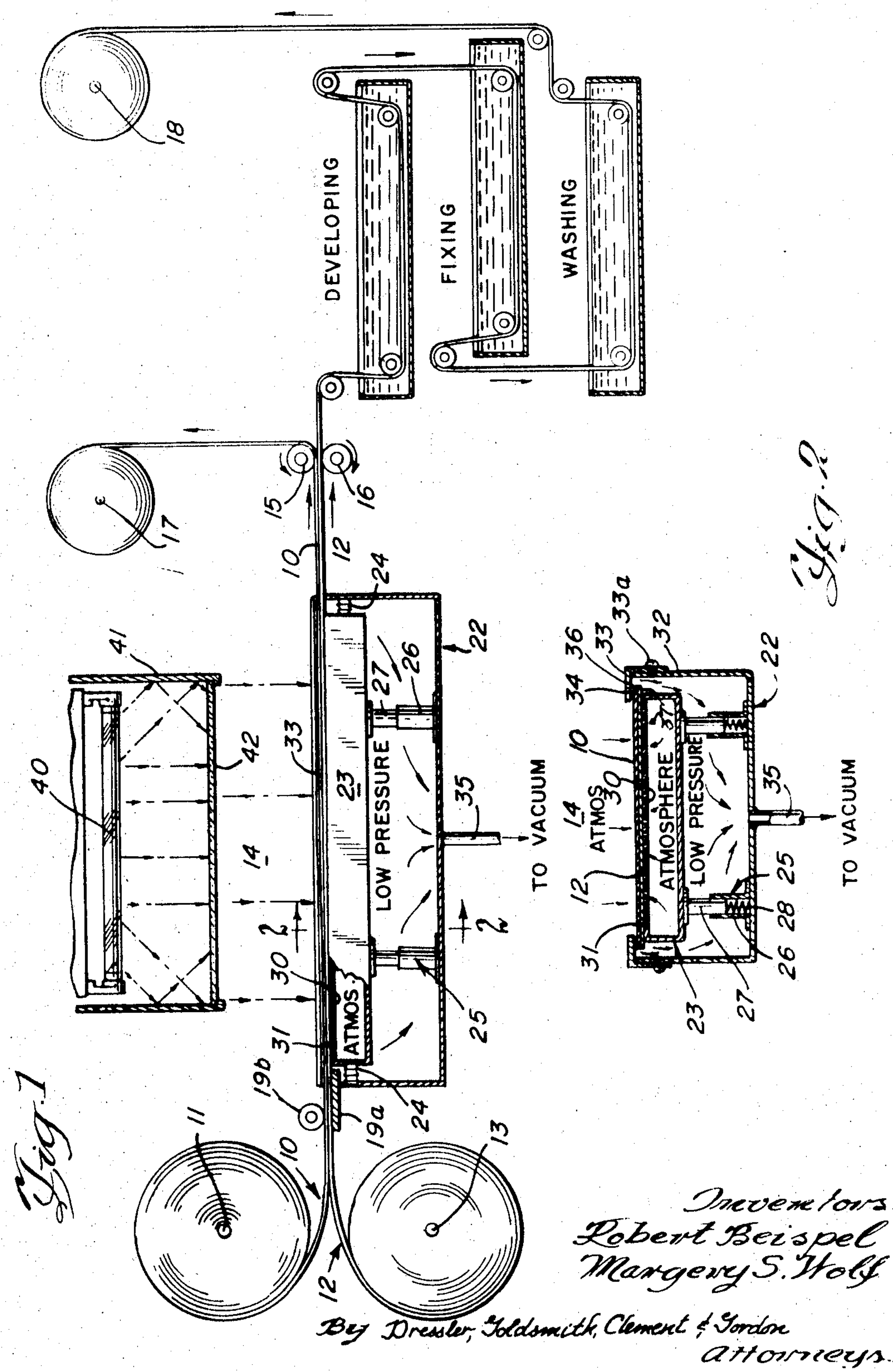
FIGURE 1 is a side elevation view, partly in section, of one embodiment of the apparatus of this invention.
FIGURE 2 is a cross-sectional view of the apparatus of FIGURE 1, taken along line 2—2 in that figure.

In FIGURE 1, exposed and developed continuous negative film 10 is stored on roller 11, and continuous web of light-sensitive material 12, upon which the desired positive image is to be printed, is stored on roller 13. After continuous film 10 and web of light-sensitive material 12 move through exposure zone 14, they pass between drive rollers 15 and 16. At least one of rollers 15 and 16 is driven, and the rollers form between them a nip sufficient to pull continuous web 10 and layer 12 so that the former can be stored on rotating roller 17, and the latter can be directed by means of suitable rollers through a developing bath, a fixing bath and a washing bath, and finally stored around rotating roller 18.

Figure 5:
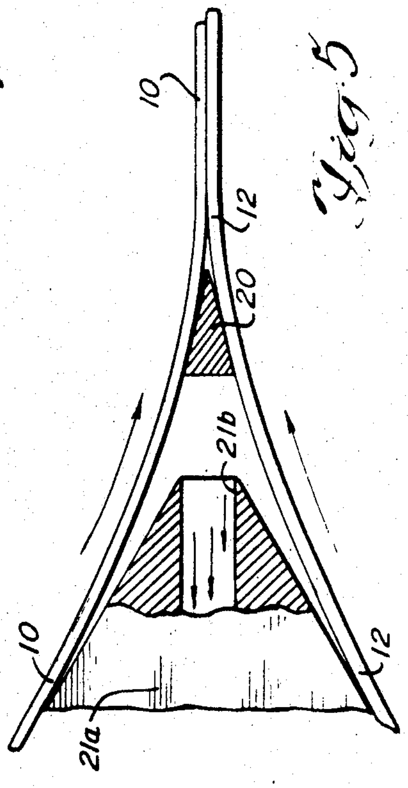
FIGURE 5 is an enlarged cross-sectional view of a device that may be included, if desired, at the input end of the embodiment of FIGURE 1.

As continuous negative film 10 and web of light-sensitive material 12 approach exposure zone 14, they pass between guide member **19*a* and idler roller 19*b*, which bring them into close proximity with each other. If desired, members 19*a* and 19*b* may be replaced by the device illustrated in FIGURE 5. Film 10 and web 12 are guided by wedge means 20 as they move from the thick to the thin end of the wedge. The film and web are led into contact with the converging outer surfaces of wedge means 20 by guide means 21*a*, and are held against the converging outer surfaces of that guide and of wedge 20 by a vacuum applied through channel 21*b***.

After passing between members **19*a* and 19*b* in FIGURE 1, the assembled film and web of light-sensitive material move through vacuum box 22, which is best seen in the cross-sectional view of FIGURE 2. Vacuum box 22 contains within it pressure differential box 23, which communicates with the atmosphere through tubes 24 at either end. Pressure differential box 23 is supported on pedestals 25, each of which comprises cylinder 26 in which piston 27 is seated so as to be urged by coil spring 28 (seated within cylinder 26) against the pressure differential box. The top wall 30 of box 23 is foraminous. In the embodiment shown, relatively large apertures or openings 31 are provided in wall 30. Continuous web 12 slides across top wall 30, which is pressed upwards against web 12 by the upward pressure of pistons 27**.

Side walls 32 of vacuum box 22 carry at their tops, brackets 33, whose vertical position may be varied by means of adjusting screws **33*a*. The underside of flange 33 extends inwardly over the outer edge portions of continuous negative film 10. The underside of the inwardly extending portion of flange 33 is provided with gasket means 34. The vertical position of flange 33 is varied so that gasket 34 is in sliding contact with the edge portions of the upper or exposed surface of continuous negative film 10**.

Vacuum box 22 is connected through conduit 35 to a vacuum source, and thus the part of the chamber not occupied by pressure differential box 23 is maintained at low pressure. As is seen in FIGURE 2, outer edge portion 36 of continuous negative film 10 and outer edge portion 37 of continuous web of light-sensitive material 12, which extend into an exposed position beyond gasket 34 above them, and beyond pressure differential box 23 below them, are subjected to the vacuum maintained in box 22. At the same time, atmospheric pressure is exerted down on exposed surface of film 10 and upward on the bottom surface of light-sensitive layer 12.

In each case, the atmospheric pressure is confined against substantial leaks into the interior of vacuum box 22. The sliding contact between continuous web 12 and the foraminous top wall of pressure differential box 23 tends to prevent air from being pulled out of box 23 into vacuum box 22, and the sliding contact between gasket means 34 and outer edge portion 36 of continuous film 10 serves to keep the ambient atmosphere from being pulled into box 22. As will be seen, the resultant pressure upon the continuous negative film from above and upon the moving web of light-sensitive material from below keep these two pressed together and in register with each other as they move through exposure zone 14.

Figure 3:
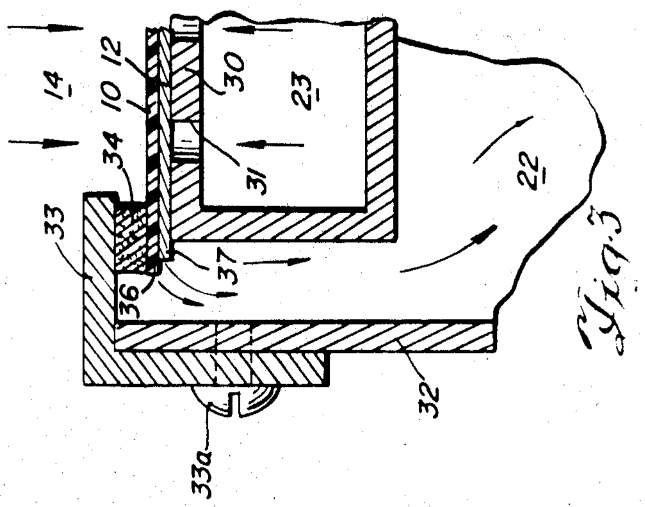
FIGURE 3 is an enlarged, fragmentary portion of FIGURE 2.

FIGURE 3 shows in enlarged view the sliding contact between gasket 34 and continuous negative film 10 and the sliding contact between continuous layer of light-sensitive material 12 and top wall 30 of differential pressure box 23. It also shows how evacuation of vacuum box 22 and the pressure of the atmosphere from above on film 10 and from below through apertures 31 on layer 12 cooperate to press web 10 and layer 12 together in register with each other as they pass through exposure zone 14.

In FIGURE 1, light source 40 is contained in chamber 41, which has reflective surfaces upon its inner walls. Bottom wall 42 of light box 41 is in the preferred embodiment of the apparatus of this invention a filter means formed of a partially reflective, partially transmitting material to reflect light rays having high angles of incidence, and to pass light rays having low angles of incidence with respect to the surface of the continuous negative film against which the light rays are directed in exposure zone 14.

Filter 42 may be formed, for example, of a vacuum plated metalized glass similar to that used in one-way mirrors, with the plating such that light rays striking the filter with an angle of incidence more than 48° will be reflected. With such a vacuum plated metalized glass filter, approximately 60 percent of the light rays emanating from light source 40 will be transmitted through the filter.

One of the important advantages of the apparatus of this invention may be seen from FIGURE 1. Because the negative film and the layer of light-sensitive material are pressed together and kept in register with each other by means of vacuum, they may be led along a straight line path through exposure zone 14. As a result, light source 40 may be made quite long, and this permits much faster movement of the film, and the material on which the positive print is to be made, through exposure zone 14.

FIGURE 4 illustrates another feature of the apparatus of this invention that may be utilized, if desired, at the output end of the embodiment shown in FIGURE 1. As continuous negative film 10 and layer of light-sensitive material 12 move beyond exposure zone 14 and through the nip between drive rolls 15 and 16, they are caused to pass on either side of wedge 50 so as to split the film and layer apart to move them outwardly from each other. To keep the separated film and layer from diverging too sharply as they move beyond this splitting position, larger wedge shaped guide means 51 is provided which pulls air through internal channel 52, which is in communication with conduit 53 leading to a vacuum source.

It is seen that as web 10 and layer 12 are split by wedge 50 they are directed outwardly and forward towards wedge shaped guide means 51. Canopy 54 encloses guide means 51 along both slanting surfaces of the wedge-shaped guide and also at the two vertical sides, in order to improve the vacuum effect through channel 52. Web 10 and layer 12 are moved on beyond guide means 51 in the same manner as at the right hand side of FIGURE 1.

It has been observed that if the vacuum maintained by the vacuum source operating through channel 52 is large enough, this vacuum will serve a dual function. In addition to keeping the negative film and layer of light-sensitive material from diverging too sharply after passing wedge 50, the vacuum will pull the film and layer of light-sensitive material through exposure zone 14.

Figure 6:
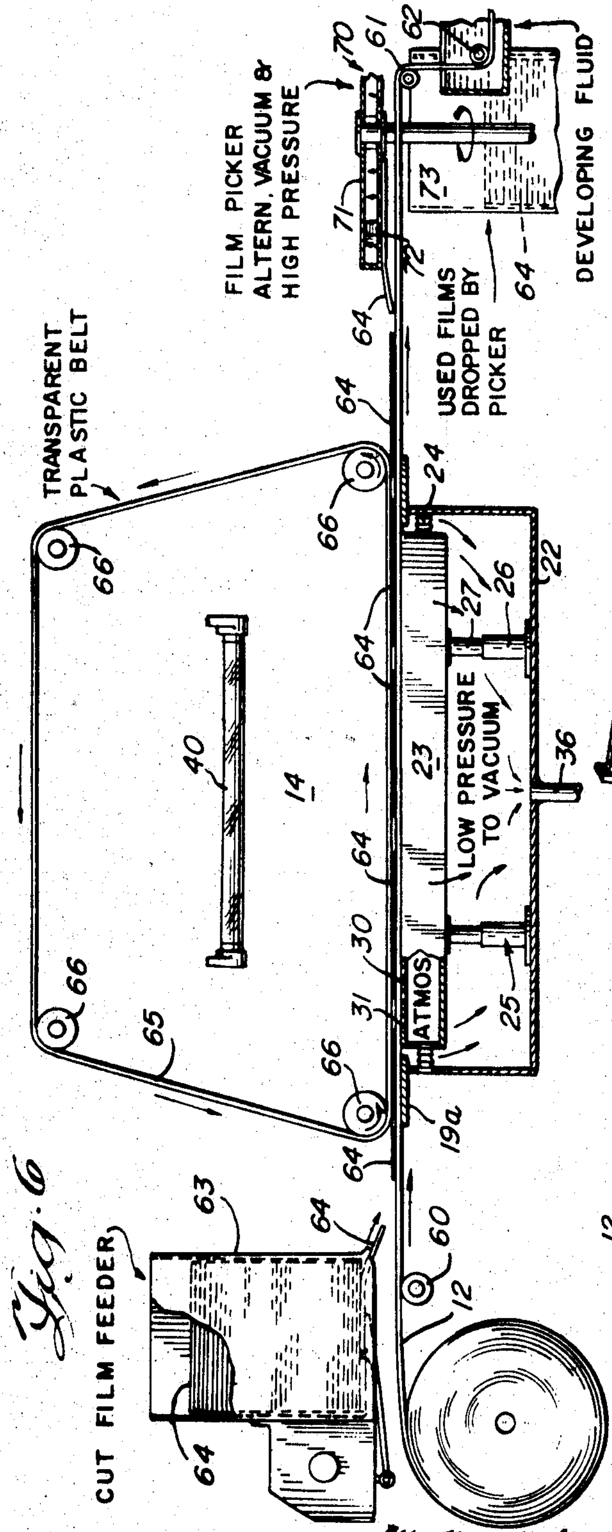
FIGURE 6 is a side elevation view, partly in section, of an embodiment of the apparatus of this invention that may be used with film that has been cut into discrete pieces.

FIGURE 6 shows an embodiment of the apparatus of this invention in which a positive image is transferred onto a continuous layer of light-sensitive material by feeding cut negative films upon the continuous layer and using the latter as a carrier for the cut films. In this embodiment, continuous layer of light-sensitive material 12 passes over idler roll 60 and from there to guide member 19*a*, through exposure zone 14, and at the output end past idler rolls 61 and 62, which guide the layer through a bath of developing fluid. As layer 12 passes through exposure zone 14, it slides over apertured top wall 30 of pressure differential box 23, with its exposed edges subjected to vacuum from vacuum box 22, just as in FIGURE 1.

Cut film feeder 63 drops cut film 64 into position upon continuous layer of light-sensitive material 12 near the entry point to exposure zone 14. Transparent plastic belt 65 moves continuously around idler rolls 66, and confines cut films 64 upon moving layer 12.

Figure 7:
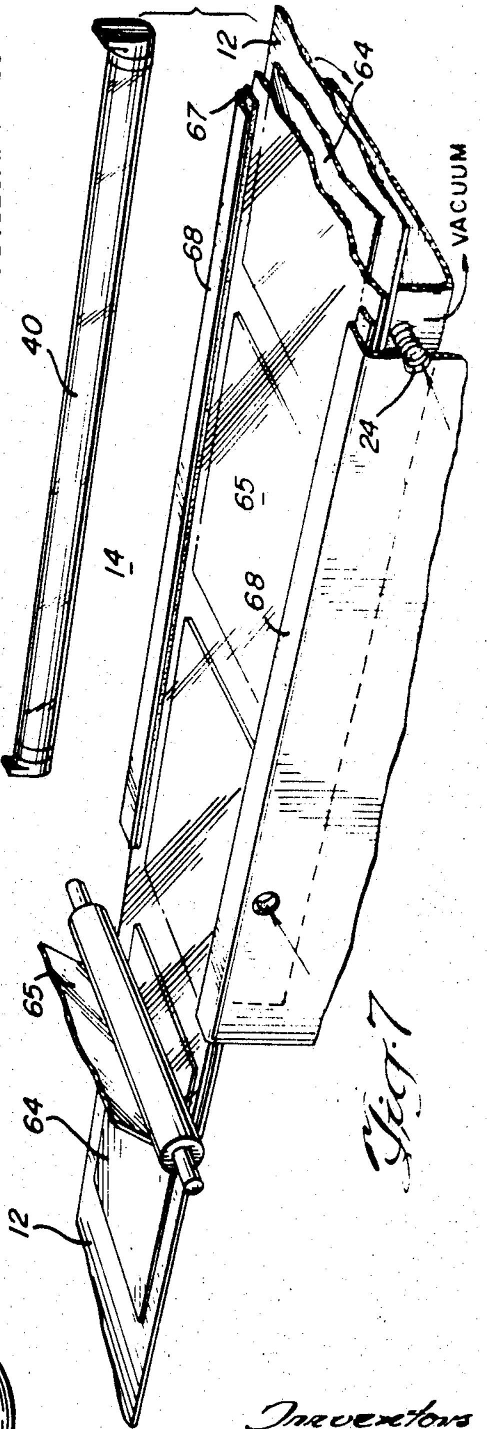
FIGURE 7 is a fragmentary perspective view showing the operation of the apparatus of FIGURE 6.

As best seen in FIGURE 7, the "sandwich" formed of endless transparent plastic belt 65, cut films 64, and continuous layer of light-sensitive material 12 moves with sliding contact upon top wall 30, and also with sliding contact with gasket 67 carried by flange 68 which extends inwardly over the outward edges of the sandwich.

As with the embodiment of FIGURE 1, the cooperation of atmospheric pressure with the low pressure in vacuum box 22 causes films 64 to be pressed against layer of light-sensitive material 12, in this case with transparent plastic belt 65 pressed down upon them. When layer 12 and cut films 64 pass out of exposure zone 14, the vacuum is released and films 64 and layer 12 may be separated.

In the embodiment shown in FIGURE 6, cut films 64 are picked off layer 12 by rotating film picker 70. Film picker 70 has a rotating drum 71 which is provided with a foraminous bottom wall 72. Vacuum is exerted through bottom wall 72 to pick up used films 64, and the head rotates until the film is over used film reservoir 73. At this juncture, the vacuum in head 71 is replaced by a slight high pressure, and the used film is caused to drop into the film reservoir.

Figure 8:
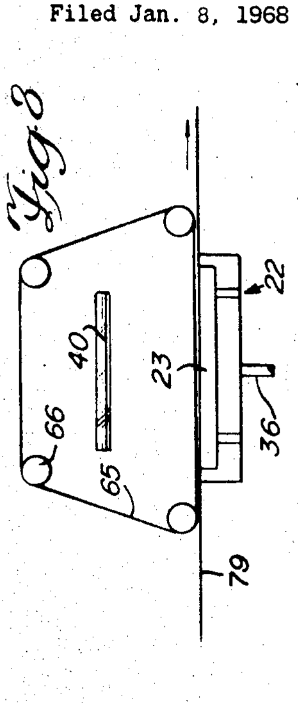
FIGURE 8 is a fragmentary side elevation of another embodiment of the apparatus of this invention.

FIGURE 8 shows still another embodiment of the apparatus of this invention in which the light-sensitive material upon which the positive image is to be printed is made up of discrete segments, just as the negative film. In this embodiment, foraminous carrier 79, which may be an endless belt, and transparent plastic belt 65 (which passes around guide rolls 66) form a sandwich between them of the negative films and the light-sensitive material upon which the print is to be made. Light source 40 is above the sandwich, and pressure differential box 22 is below.

As is seen, just prior to passing through the exposure zone, continuous film 10 and web 12 are brought into close proximity with each other as they pass between roller 66 shown in the lower left-hand corner of FIGURE 8 and foraminous carrier 79.

Figures 9, 10, 11:
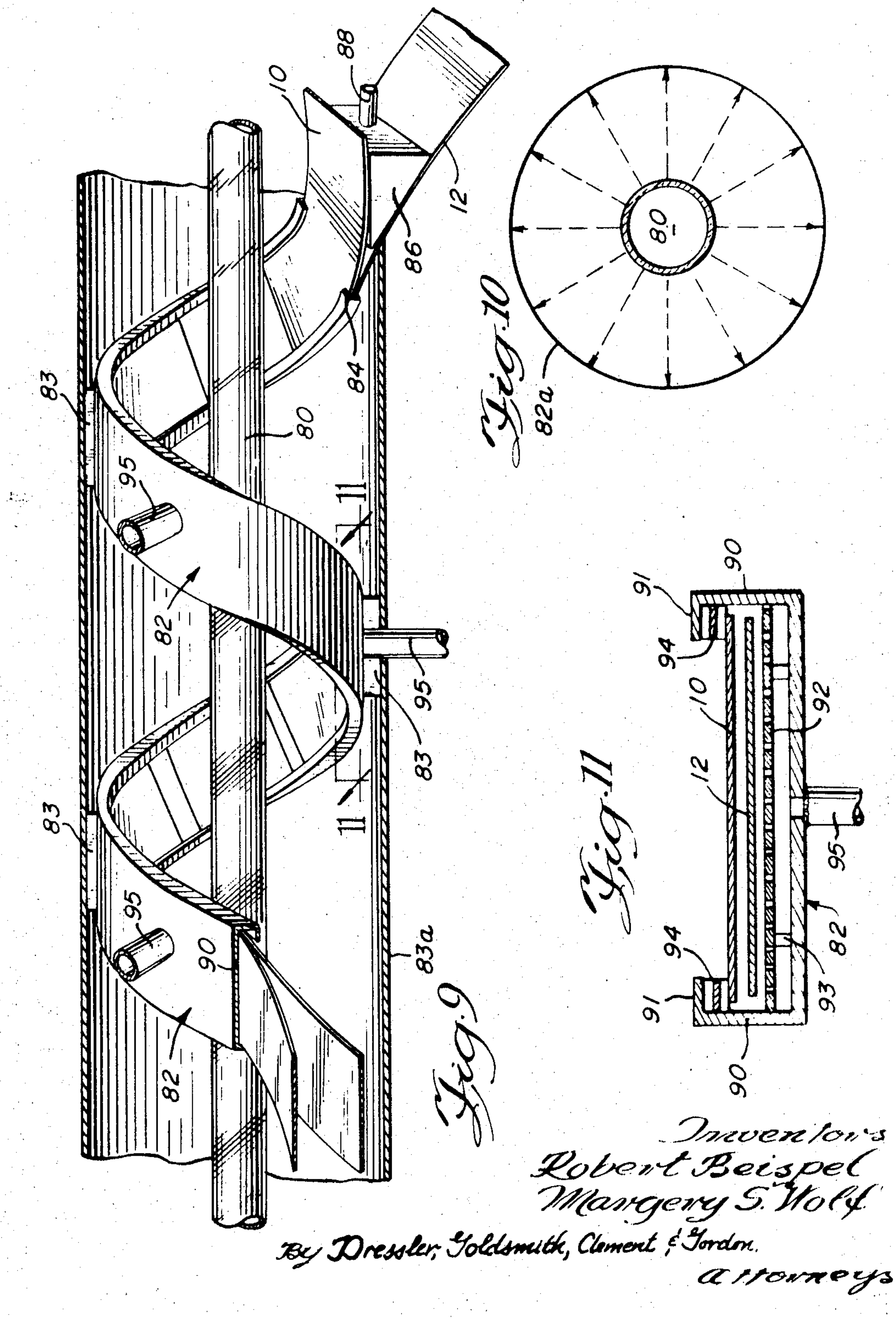
FIGURE 9 is a side elevation of another embodiment of the apparatus of this invention.
FIGURE 10 is a diagrammatic view of a linear light source employed in the apparatus of FIGURE 9, showing the uniform impingement of light rays upon the master film and light-sensitive layer of material which are fed into the apparatus.

FIGURE 9 is a side elevation of still another embodiment of the apparatus of this invention in which the light rays emanating from a linear light source always strike the exposed surface of the negative film at right angles. This is achieved by arranging the means for moving negative film 10 and light-sensitive web 12 through an exposure zone along a helical path disposed around a linear light source as the center of the path. In FIGURE 9, light source 80 is located at the axis of the helix formed by combination guide and vacuum means 82. Positioning fins 83 of cylindrical mounting member 83*a* provide support for guide and vacuum means 82, and the ends of member 83*a* provide support for light source 80. Continuous negative film 10 and continuous layer of light-sensitive material 12 are fed into input end 84 of helix 82, after passing over vacuum wedge 86 which is connected through tube 88 to a vacuum source (not shown). Vacuum wedge 86 may be constructed in a manner generally similar to wedges 21*a* and 51, described above.

At the other end of the exposure zone, negative film 10 and light-sensitive layer 12 leave output end 90 of helical means 82. Means are preferably provided both for pulling film 10 and layer 12 and for driving them, through the helical path defined by means 82. (Neither of the means for moving the assembled negative film and light-sensitive layer through the helical path is shown.) When the film and web leave helical means 82, they are no longer subjected to vacuum, and are caused to diverge.

FIGURE 10 shows diagrammatically how light rays emanating from linear light source 80 radiate in all directions for 360° around the light source. The path followed by the assembled negative film 10 and light-sensitive layer 12 as they are guided through a helical course by means 82 is shown diagrammatically as 82*a*. As will be seen, the negative film and light-sensitive layer of material are spaced from light source 80 at the same distance at all times as they pass through the exposure zone. For this reason, the resulting printing upon the light-sensitive material will be sharp and clear, and the exposure will be even throughout.

Figure 11:
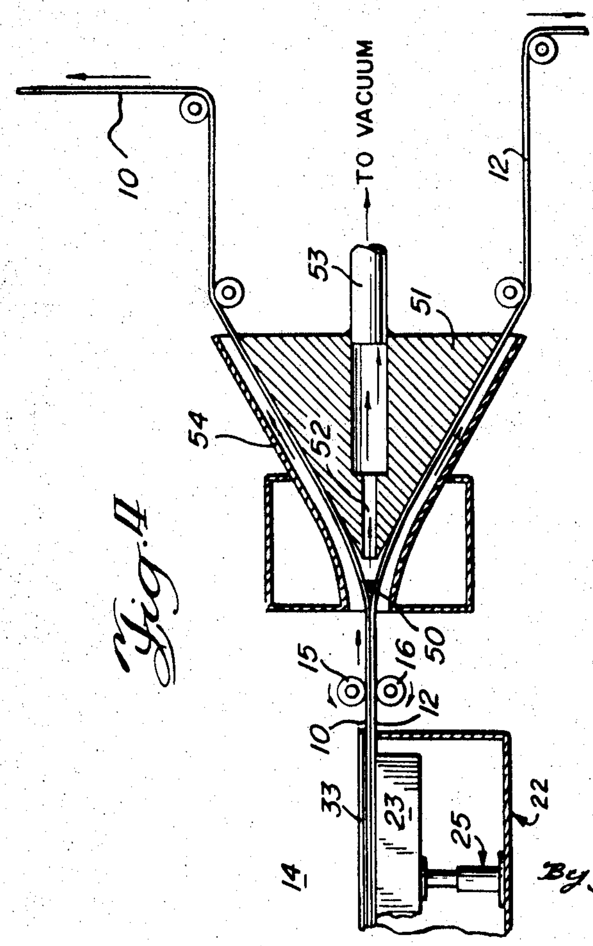
FIGURE 11 is an enlarged fragmentary cross-sectional view, taken along the line 11—11, of a portion of the apparatus of FIGURE 9.

FIGURE 11 shows in cross section how guide and vacuum means 82 supports negative film 10 and light-sensitive web 12 as they pass through the helical path defined by means 82. Side wall 90 of guide and vacuum means 82 is terminated in an end flange 91 at its outer portion. At its inner portion, near the backing member 82, foraminous plate 92 is supported on pillars 93. Ribbon spring 94 is shaped into the same helical form as guide means 82, and is positioned between outer flange 91 and foraminous plate 92, at the side of the channel formed by guide means 82 and its two upstanding side walls 90.

As will be seen from FIGURE 11, film 10 and light-sensitive layer 12 form an assemblage that is guided through the helical path of means 82. Vacuum line 95 leads from guide and vacuum means 82 to a vacuum source (not shown), to evacuate the space beneath foraminous plate 92. The low pressure beneath foraminous plate 92, together with pressure exerted by ribbon spring 94, combine to keep negative film 10 and light-sensitive layer 12 assembled and in register as they pass through the helical path defined by means 82.

Figure 12:
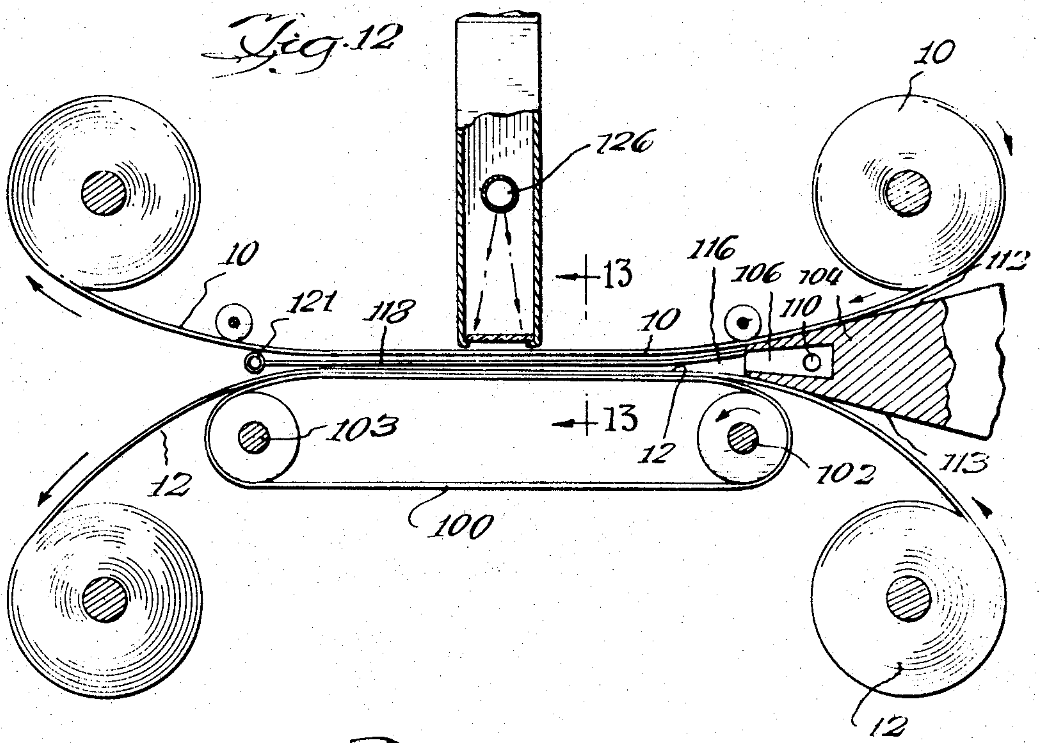
FIGURE 12 is a fragmentary cross-sectional view of one embodiment of the invention which has a wire for separating the side edges of the negative film and the layer of light-sensitive material.
Figure 13:
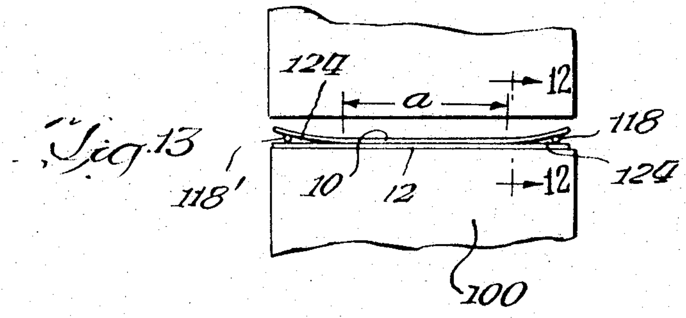
FIGURE 13 is a fragmentary cross-sectional elevation taken along the line 13—13 of FIGURE 12.
Figure 14:
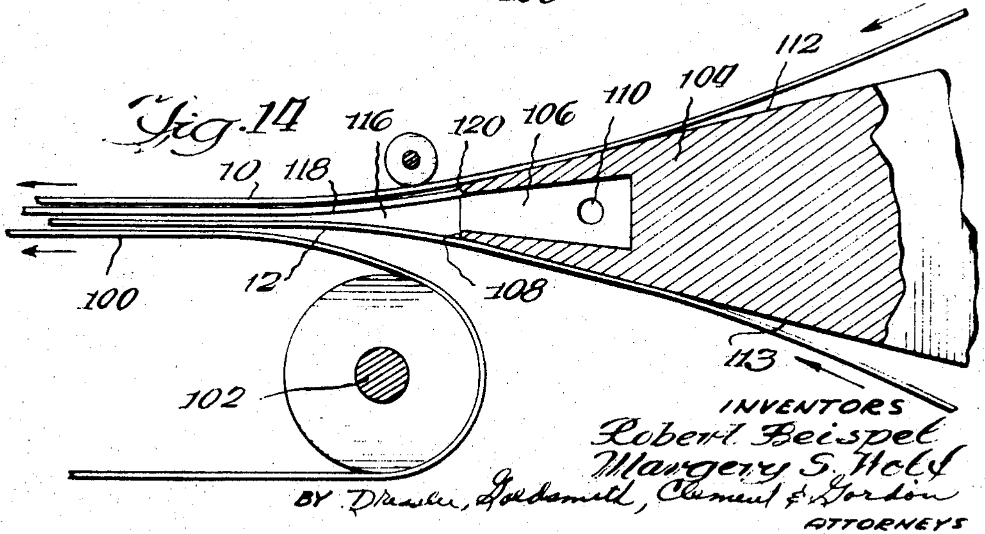
FIGURE 14 is an enlarged fragmentary view of the right hand portion of the apparatus of FIGURE 12.

In the embodiment illustrated in FIGURES 12–14, negative film 10 and light-sensitive web 12 are supported by an endless belt 100 which is driven by roller 102 and idles on roller 103. The film 10 and web 12 are separated at the input side by a wedge 104 which defines a cavity 106 extending to the outside of the wedge 104 at the small end 108 thereof.

A vacuum pipe 110 extending from a vacuum pump (not shown) communicates with the cavity 106 to evacuate the air therefrom. As shown in FIGURES 12 and 14, the negative film 10 is guided along the top surface 112 of the wedge and the web 12 is guided along the bottom surface 113 of the wedge, thereby creating an evacuated region 116 defined by the separated film 10 and web 12.

A pair of wires 118 and 118′ are positioned longitudinally with respect to support belt 100, at opposite sides thereof. Both of the wires are fastened at one end 120 to wedge 104 and at their other end to a pin 121 which traverses the width of the belt 100 and is located a small distance above it (see FIGURE 12). As seen most clearly in FIGURE 13, wires 118 and 118′ separate the side edges of negative film 10 from the side edges of the web 12, while permitting the central or image portion *a* of the negative film to be pressed against the web 12. Wires 118 and 118′ may be solid, foraminous, of spiral configuration or other suitable form.

It is seen that the regions 124, between the separated edge portions of film 10 and web 12, communicate with region 116, which in turn communicates with vacuum cavity 106. Therefore, when the system is in operation, a vacuum is applied between the side edge portions of film 10 and web 12, to cause the central or image portion *a* of the film 10 and the web 12 to be pressed tightly together. The film and web may be continuously driven at a rapid rate under light source 126 to effect the desired chemical change in the light-sensitive web material 12, and the film and web will remain in register and tightly pressed together until they are mechanically separated at the output side.

The above detailed description is given for clarity of understanding only. No unnecessary limitations should be understood therefrom, as modifications will be obvious to one skilled in the art. It should be understood that as used herein, the terms "negative" and "positive" are not intended to be restrictive, and the "negative" film could contain a "positive" image according to the usual convention, which would cause the light-sensitive material to receive an image that according to the usual convention would be considered a "negative" image.

What is claimed is:

1. In a system for contact printing of a desired image upon a moving continuous web of light-sensitive material from a given continuous patterned transparent film corresponding to said desired image, apparatus for positioning said continuous film with respect to said continuous web of light-sensitive material, which comprises (a) means for bringing said continuous film into close proximity with said continuous web; (b) means for separating the side edges of said film from the corresponding side edges of said continuous web, said separating means permitting the central, image portion of said film to be in contact with said continuous web; (c) means for applying a vacuum to the inner surfaces of said film and web to keep said image portion and the corresponding surface portion of said web pressed together and in register with each other; (d) means for moving said film and web of light-sensitive material thus assembled through an exposure zone; and (e) means for guiding said film and said web of light-sensitive material away from each other after they have left said exposure zone and are no longer subjected to said vacuum.

2. In a system for contact printing as described in claim 1, apparatus for positioning said continuous patterned transparent film with respect to said continuous web of light-sensitive material as described in said claim in which said vacuum-applying means applies a vacuum to the inner surfaces of the edge portions of said film and web while the edges of the film and web are separated as there described.

3. In a system for contact printing of a desired image upon a moving continuous web of light-sensitive material from a given continuous patterned transparent film corresponding to said desired image, apparatus for positioning said continuous film with respect to said continuous web of light-sensitive material, which comprises (a) means for bringing said continuous film into close proximity with said continuous web; (b) means for separating the side edges of said film from the corresponding side edges of said continuous web, said separating means permitting the central, image portion of said film to be in contact with said continuous web; (c) means for applying a vacuum to said film and web to keep said image portion and the corresponding surface portion of said web pressed together and in register with each other, said vacuum applying means comprising a wedge-shaped device having a small end tapering outwardly to form a first surface for guiding said web of light-sensitive material and a second surface for guiding said film, said wedge-shaped device defining a cavity extending to the outside of said wedge-shaped device at the small end thereof, and air evacuating means connecting with said cavity for providing a vacuum therein; (d) means for moving said film and web of light-sentitive material thus assembled through an exposure zone; and (e) means for guiding said film and said web of light-sensitive material away from each other after they have left said exposure zone and are no longer subjected to said vacuum.

4. In a system for contact printing as described in claim 3, apparatus for positioning said continuous patterned transparent film with respect to said continuous web of light-sensitive material as described in said claim in which said separating means comprises a wire interposed between each of the side edges of said film and the corresponding side edge of said continuous web.

5. In a system for contact printing as described in claim 3, apparatus for positioning said continuous patterned transparent film with respect to said continuous web of light-sensitive material in which said vacuum-applying means applies a vacuum to the inner surfaces of the edge portions of said film and web while the edges of the film and web are separated as there described.

6. In a system for contact printing of a desired image upon a moving continuous web of light-sensitive material from a given continuous patterned transparent film corresponding to said desired image, apparatus for positioning said continuous film with respect to said continuous web of light-sensitive material, which comprises (a) means for bringing said continuous film into close proximity with said continuous web; (b) means for separating the side edges of said film from the corresponding side edges of said continuous web, said separating means permitting the central, image portion of said film to be in contact with said continuous web, said separating means comprising a wire interposed between each of the side edges of said film and the corresponding side edge of said continuous web; (c) means for applying a vacuum to said film and web to keep said image portion and the corresponding surface portion of said web pressed together and in register with each other; (d) means for moving said film and web of light-sensitive material thus assembled through an exposure zone; and (e) means for guiding said film and said web of light-sensitive material away from each other after they have left said exposure zone and are no longer subjected to said vacuum.

7. Apparatus for contact printing of a desired image upon a moving continuous web of light-sensitive material from a given continuous film corresponding to the desired image, which comprises: (a) means for bringing said continuous film and said continuous web of light-sensitive material into close proximity with each other; (b) an endless belt for supporting said continuous film and web; (c) means for separating the side edges of said film from the corresponding side edges of said continuous web, said separating means permitting the central, image portion of said film to be in contact with said continuous web; (d) means for applying a vacuum to said film and web to keep said image portion and the respective surface portion of said web pressed together and in register with each other, said vacuum applying means comprising a wedge-shaped device having a small end tapering outwardly to form a first surface for guiding said web of light-sensitive material and a second surface for guiding said patterned transparent film, said wedge-shaped device defining a cavity extending to the outside of said wedge-shaped device at the small end thereof, an air evacuating means communicating with said cavity for forming a vacuum therein; (e) a light source in an exposure zone; (f) means for continuously pulling said film, web of light-sensitive material, and endless belt thus assembled through said exposure zone, with said light source positioned to direct light upon the exposed surface of said film, while application of said vacuum is continued; and (g) means for guiding said film, web of light-sensitive material, and endless belt away from each other after said film and web have left said exposure zone and are no longer subjected to said vacuum.

8. Apparatus for contact printing as described in claim 7, wherein said separating means includes a wire interposed between each of the side edges of said patterned transparent film and the corresponding side edge of said continuous web.

9. Apparatus for contact printing of a desired image upon a moving continuous web of light-sensitive material from a given continuous patterned transparent film corresponding to the desired image, which comprises: (a) means for bringing said continuous film and said continuous web of light-sensitive material into close proximity with each other; (b) an endless belt for supporting said continuous film and web; (c) means for separating the side edges of said film from the corresponding side edges of said continuous web, said separating means permitting the central, image portion of said film to be in contact with said continuous web, said separating means including a wire interposed between each of the side edges of said patterned transparent film and the corresponding side edge of said continuous web; (d) means for applying a vacuum to said film and web to keep said image portion and the respective surface portion of said web pressed together and in register with each other; (e) a light source in an exposure zone; (f) means for continuously pulling said film, web of light-sensitive material, and endless belt thus assembled through said exposure zone, with said light source positioned to direct light upon the exposed surface of said film, while application of said vacuum is continued; and (g) means for guiding said film, web of light-sensitive material, and endless belt away from each other after said film and web have left said exposure zone and are no longer subjected to said vacuum.

10. Apparatus for contact printing of a desired image upon a moving continuous web of light-sensitive material from a given continuous patterned transparent film corresponding to the desired image, which comprises: (a) means for bringing said continuous film and said continuous web of light-sensitive material into close proximity with each other; (b) an endless belt for supporting said continuous film and web; (c) means for separating the side edges of said film from the corresponding side edges of said continuous web, said separating means permitting the central, image portion of said film to be in contact with said continuous web; (d) means for applying a vacuum to the inner surfaces of said film and web to keep said image portion and the respective surface portion of said web pressed together and in register with each other; (e) a light source in an exposure zone; (f) means for continuously pulling said film, web of light-sensitive material, and endless belt thus assembled through said exposure zone, with said light source positioned to direct light upon the exposed surface of said film, while application of said vacuum is continued; and (g) means for guiding said film, web of light-sensitive material, and endless belt away from each other after said film and web have left said exposure zone and are no longer subjected to said vacuum.

11. A method for moving a first film carrying recorded information past an information retrieval station while said film remains in register with a second film to which said information is to be transferred, which comprises the steps of (a) bringing said first film into close proximity with said second film; (b) separating the side edges of said first film from the corresponding side edges of said second film, while permitting the portion of said first film having recorded information thereon to be in contact with said second film; (c) applying a vacuum to the inner surfaces of said first and second film to keep said information portion of said first film and the respective surface portion of said second film pressed together and in register with each other; (d) moving said first film and said second film thus assembled through a transfer zone; (e) providing a chemical change in said second film while it is passing through said information retrieval station; and (f) releasing said vacuum and separating said first and second films after they have left said information retrieval station.

12. The method of claim 11 in which said vacuum is applied to the inner surfaces of the edge portions of said first and second films while the edges of the films are separated as there described.

13. A method for contact printing of a desired image upon a moving layer of light-sensitive material from a given patterned transparent film corresponding to said image, which comprises the steps of: (a) supporting said layer of light-sensitive material upon a moving carrier; (b) bringing said film into close proximity with said layer of light-sensitive material; (c) separating the side edges of said film from the corresponding side edges of said light-sensitive material, while permitting the central, image portion of said film to be in contact with said light-sensitive material; (d) applying a vacuum to the inner surfaces of said film and layer to keep said image portion and the respective surface portion of said layer pressed together and in register with each other; (e) moving said film and layer of light-sensitive material thus assembled through an exposure zone; (f) directing light upon the exposed surface of said film while it is passing through said zone; and (g) releasing said vacuum and separating said film and said layer of light-sensitive material after they have left said exposure zone.

14. The method of claim 13 in which said vacuum is applied to the inner surfaces of the edge portions of said patterned transparent film and layer of light-sensitive material while the edges of said film and layer are separated as there described.

References Cited

UNITED STATES PATENTS 2,408,310 9/1946 Hassler ---------------- 95—75

NORTON ANSHER, Primary Examiner

RICHARD L. MOSES, Assistant Examiner

U.S. Cl. X.R.

226—95; 271—74; 355—94